United States Patent
Hasberg et al.

(10) Patent No.: US 11,092,445 B2
(45) Date of Patent: Aug. 17, 2021

(54) METHOD AND SYSTEM FOR LOCALIZING A VEHICLE

(71) Applicant: Robert Bosch GmbH, Stuttgart (DE)

(72) Inventors: Carsten Hasberg, Ilsfeld-Auenstein (DE); Christoph Schroeder, Sunnyvale, CA (US); Danny Hiendriana, Ludwigsburg (DE); Oliver Pink, Ditzingen (DE); Philipp Rasp, Wannweil (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 16/342,469

(22) PCT Filed: Aug. 28, 2017

(86) PCT No.: PCT/EP2017/071522
§ 371 (c)(1),
(2) Date: Apr. 16, 2019

(87) PCT Pub. No.: WO2018/072915
PCT Pub. Date: Apr. 26, 2018

(65) Prior Publication Data
US 2020/0056893 A1   Feb. 20, 2020

(30) Foreign Application Priority Data

Oct. 17, 2016   (DE) .................. 102016220249.9

(51) Int. Cl.
*G01C 21/32*   (2006.01)
*G05D 1/00*   (2006.01)
*G05D 1/02*   (2020.01)

(52) U.S. Cl.
CPC .......... *G01C 21/32* (2013.01); *G05D 1/0088* (2013.01); *G05D 1/0274* (2013.01); *G05D 2201/0213* (2013.01)

(58) Field of Classification Search
CPC ...... G01C 21/32; G01C 21/30; G05D 1/0088; G05D 1/0274; G05D 2201/0213
See application file for complete search history.

(56) References Cited

U.S. PATENT DOCUMENTS

2009/0228204 A1* 9/2009 Zavoli ................ G01S 19/49
                                                               701/532
2010/0328462 A1* 12/2010 Chen ..................... B60R 1/00
                                                               348/148

(Continued)

FOREIGN PATENT DOCUMENTS

DE   102010028090 A1 * 12/2011 ............. G01C 21/32
DE   102010028090 A1   12/2011

(Continued)

OTHER PUBLICATIONS

International Search Report for PCT/EP2017/071522, dated Dec. 8, 2017.

*Primary Examiner* — Marthe Y Marc-Coleman
(74) *Attorney, Agent, or Firm* — Norton Rose Fulbright US LLP; Gerard Messina

(57) ABSTRACT

A method and a corresponding system for localizing a vehicle using a digital map are described. In accordance with the method, the digital map assigns to the features one or a plurality of predetermined attributes, which are provided for characterizing possibly occurring actual changes in the features comparison to the digital map existing at the moment. On the basis of the assigned attributes, probabilities relative to the changes are also determined, and the vehicle is localized in consideration of the determined probabilities.

18 Claims, 2 Drawing Sheets

(56) References Cited

U.S. PATENT DOCUMENTS

2015/0233720 A1* 8/2015 Harada .................. G01C 21/30
701/409
2016/0187144 A1 6/2016 Modica et al.

FOREIGN PATENT DOCUMENTS

| JP | 2000321081 A | 11/2000 |
| JP | 2013214230 A | 10/2013 |
| JP | 2015155903 A | 8/2015 |
| KR | 20100000386 A | 1/2010 |

* cited by examiner

METHOD AND SYSTEM FOR LOCALIZING A VEHICLE

FIELD OF THE INVENTION

The present invention relates to a method and a system for localizing a vehicle. In particular, the present invention relates to a method and a system for localizing a vehicle using a digital map.

BACKGROUND INFORMATION

Driver assistance systems are generally known and are widely used for controlling vehicles. Moreover, in the future, there will be a multitude of highly automated, respectively fully automated driver assistance functions, where the vehicle will be automatically controlled without being continuously monitored by the driver. Of primary importance for highly and fully automated driving is the capability of the vehicle, respectively of the corresponding function, to perform an accurate and up-to-date localization of the vehicle at any time. This means that accurate information about where the vehicle is at the moment is always needed.

Driver assistance systems and automated driving systems are thereby often dependent on the use of a digital map, respectively of an electronic road map; for purposes of localization, features recorded by sensors being able to be compared to those in an available map. The localization is dependent on the features stored in the map being up-to-date and reflective of reality.

The South Korean publication KR2010000386A describes a vehicle navigation system and a method for updating an electronic map; received change data being compared to existing map data, and a percentage of a change rate of a particular map region being subsequently computed; the computed change rate being able to differ depending on the map region. If the percentage computed in this manner exceeds a threshold value, the map region is automatically updated accordingly. The threshold values can thereby differ depending on the region or type of road. Otherwise, the decision about the change is left to the driver, who is aided in decision making by a display.

There continues to be a need to provide a system and a method that will enable an incorrect or outdated map to be detected as rapidly as possible and signaled to the vehicle and/or to the function.

SUMMARY

A system and a method for localizing a vehicle, a corresponding vehicle, and a computer program product, which is provided for use in connection with a vehicle, are provided in accordance with the independent patent claims.

Preferred embodiments of the present invention are derived from the dependent claims.

An aspect of the present invention provides a method for localizing a vehicle, which employs a digital map that describes the features, in particular of the environment of a vehicle. The digital map thereby assigns to the features one or a plurality of predetermined attributes, which are provided for characterizing possibly occurring changes in the features in comparison to the digital map existing at the moment. On the basis of the assigned attributes, probabilities relative to the changes are also determined, and the vehicle is localized in consideration thereof.

Furthermore, another aspect of the present invention provides a corresponding system for localizing a vehicle, the system having a digital map and a localization unit for localizing the vehicle using the digital map. To take into account a particular feature changing over time in comparison to the digital map, the digital map has one or a plurality of predefined corresponding attributes relating to the particular feature. In addition, the localization unit is adapted for determining a probability associated with the change on the basis of the attributes and for including it in the localization of the vehicle.

Aspects of the present invention may enhance an identification or recognition of incorrect or outdated maps. This is made possible, in particular by the fact that, in addition to the customary information pertaining to the features described by the map, the digital map is able to record an attribute that is used to define a current probability for the feature to change. This makes it advantageously possible to take into account that the features are at least partially less likely to be up-to-date, especially as features, which may be more accurately included as localization technology continues to develop, increase in number, and that, instead, changes occur in the interim.

The assignment of one or of a plurality of predefined attributes may include using a digital map that had been expanded by the predefined attributes; the expansion being possible, for example, by the provision of an additional digital map layer. The assignment may also include the localization system receiving the predefined attributes, and the digital map being subsequently expanded by the attributes.

Since the present method provides that the map be expanded by relevant attributes, such a change may be selectively taken into account anticipatorily and assessed more specifically, even when there is no corresponding map updating. This makes it possible to substantially enhance the robustness of the localization with respect to changes in the environment.

For example, upon localization of the vehicle, it may be apparent that an assigned attribute of a feature indicates that a change is more likely in comparison to other features or in comparison to a previous point in time. In this case, there is an indication of an outdated or incorrect map that the system is able to further process automatically in accordance with a preferred procedure.

Thus, particularly in autonomous driving modes in which the vehicle itself assumes the control of the vehicle control, so that there is no need for a driver to intervene in the vehicle control; the localization system decides not to use the feature for the localization or, in case of doubt, to give preference to a sensor measurement. It is also conceivable that an updating request for the digital map be initiated in response to a specific probability of a feature reaching a predetermined threshold value.

Preferably, all types of elements of the contents of the digital map relevant to the vehicle localization come under consideration as features to be expanded upon. Depending on the map, the percentage of features, which are expanded by attributes, may thereby vary.

In accordance with one especially preferred specific embodiment, the features generally, at least primarily, relate to features that are influenced by people. These features are subject both to an ageing process, which necessitates that they be maintained in regular cycles, as well as to structural changes.

The features may preferably relate to objects that are located in the environment of the vehicle, for example, lane markings, bridges, buildings, sign gantries, road signs, etc., in the vicinity of the vehicle. However, the features may also include more extensive information or metainformation.

Thus the aspects of the present invention are not limited to specific features, but, in principle, may relate to all types of features.

In many specific embodiments, a feature may not only relate to one single object, but also to a plurality of objects and subfeatures. It is thus conceivable that a feature in the digital map relates to information about a number of specific objects or features, such as a number of lane markings, for example.

The attributes may, in particular be presented as attribute name and attribute value; it being possible that the attribute values be assigned dedicatedly to individual features. In other words, each feature may include the corresponding attribute and an associated value. The attributes used may be stored in an additional map layer, for example.

In descriptive terms, in accordance with aspects of the present invention, the features may thus be supplemented by at least one new attribute that refers to a characterization of the changes to be expected, respectively the probabilities therefor.

A preferred specific embodiment provides that at least one of the attributes include a value that is specified in accordance with the particular type of a specific feature. Thus, in each particular case, various types of features, for example, signs or road markings may be handled similarly or uniformly. The assigned values may thereby be ranked by comparison to each other as a function of the type of feature.

Because the features may be classified by types and, as a function of the type, may each be provided with a specific value, the attributes may be efficiently and effectively processed. For example, statistical outputs may be advantageously used to determine the procedural, type-specific attribute values. Moreover, the number of values to be assigned may be limited and restricted to a specific number.

In addition, attributes may be used that are essentially neutral with respect to the type of feature. They may refer in each case to information that focuses on a specific feature and may be derived, for example, from a previous updating of the map material or from additional information sources and determinations.

In accordance with a preferred specific embodiment, a first one of the attributes is information about a cycle time or change rate derived from the type of feature, and a second one of the attributes is information about a point in time of a most recent change that is specific to a single feature. In other words, in this specific embodiment, the features are supplemented by the attributes, in each case by information about the cycle time, respectively change rate, as well as by information about the point in time of the most recent change.

Another preferred specific embodiment of the present invention provides that a progression-over-time model of the probability for a particular feature to change be determined on the basis of the attributes.

This makes it possible to further enhance the accuracy of the localization and, at the same time, accelerate the processing. The probability may also be thereby advantageously computed for future points in time as well, and retrieved whenever required.

A periodic curve for the progression over time may be assumed in accordance with an advantageous embodiment. This specific embodiment may be used quite advantageously for the selected attributes, together with a cycle time and a time of the recent change. In addition, the curve may be assumed to rise superlinearly; in descriptive terms, thereby resulting altogether in a sharp, sawtooth curve.

This makes it possible to especially consider that, in the case of many features, changes typically occur shortly after the described feature is created or changes thereto occur at a low rate; with increasing lifetime, the rate of change increasingly rising, however.

Thus, for every considered feature, the aspects of the present invention make it possible to determine a probable availability or updatedness, thereby enhancing the reliability of the localization.

In accordance with a specific embodiment of the present invention, upon updating of the digital map, or in the case of partial updates that only concern a number of the features, the attributes, in particular the values thereof, which are assigned to a particular feature, are adapted accordingly. The feature values may be thereby changed, in particular, or assigned for the first time. In addition, probability curves may also be recalculated and/or corrected.

Thus, an aspect of the present invention also provides a method for updating a digital map.

In a preferred specific embodiment, the system also features an attribute recording unit. It makes it possible to expand existing maps and the features thereof by the additional procedural attributes, for example, by an attribute that describes the rate of change. To that end, the attribute recording unit may be connected to a memory for the digital map, in which the recorded attributes to be assigned are stored, in particular in an additional map layer.

In addition, the system preferably has an attribute updating unit for updating the relevant attributes and the values thereof in response to an updating of the map data. The updating unit may be connected to the memory for the digital map and be configured for comparing and, in some cases, adapting the additional attributes according to the present invention in the case of a map updating. This may be a changing, deletion, or creation of the attribute and of the attribute value.

In accordance with a special use of the present invention, features in the driving environment of the vehicle are recorded using a driving environment sensor system. In addition, the recorded features may thereby be compared to the map data. Furthermore, the ascertained probabilities may be consulted on the basis of the result of the comparison. Thus, when the comparison yields an ambivalence, the features may be prioritized and/or weighted on the basis of the respective probable availability or updatedness determined from the attributes. The sum of the features prioritized, respectively weighted in this manner may then be processed by a localization filter.

This specific embodiment is to be used quite advantageously for vehicles that are in an autonomous driving mode.

Another aspect of the present invention also provides for a vehicle, such as an autonomously driving vehicle, for example. A control unit of the vehicle is thereby connected to the inventive system for localizing a vehicle and configured in such a way that the method according to the present invention may be used for localizing the vehicle.

Furthermore, another aspect of the present invention provides that a computer program product also be provided for use in connection with a vehicle. The computer program product features commands which implement the procedural steps described above. The commands are loadable into a memory that is or may be connected to a control unit of the vehicle. The computer program product is thereby adapted to enable the vehicle to be localized by the method according to the present invention in response to the control unit executing the commands.

DETAILED DESCRIPTION

Figure 1:
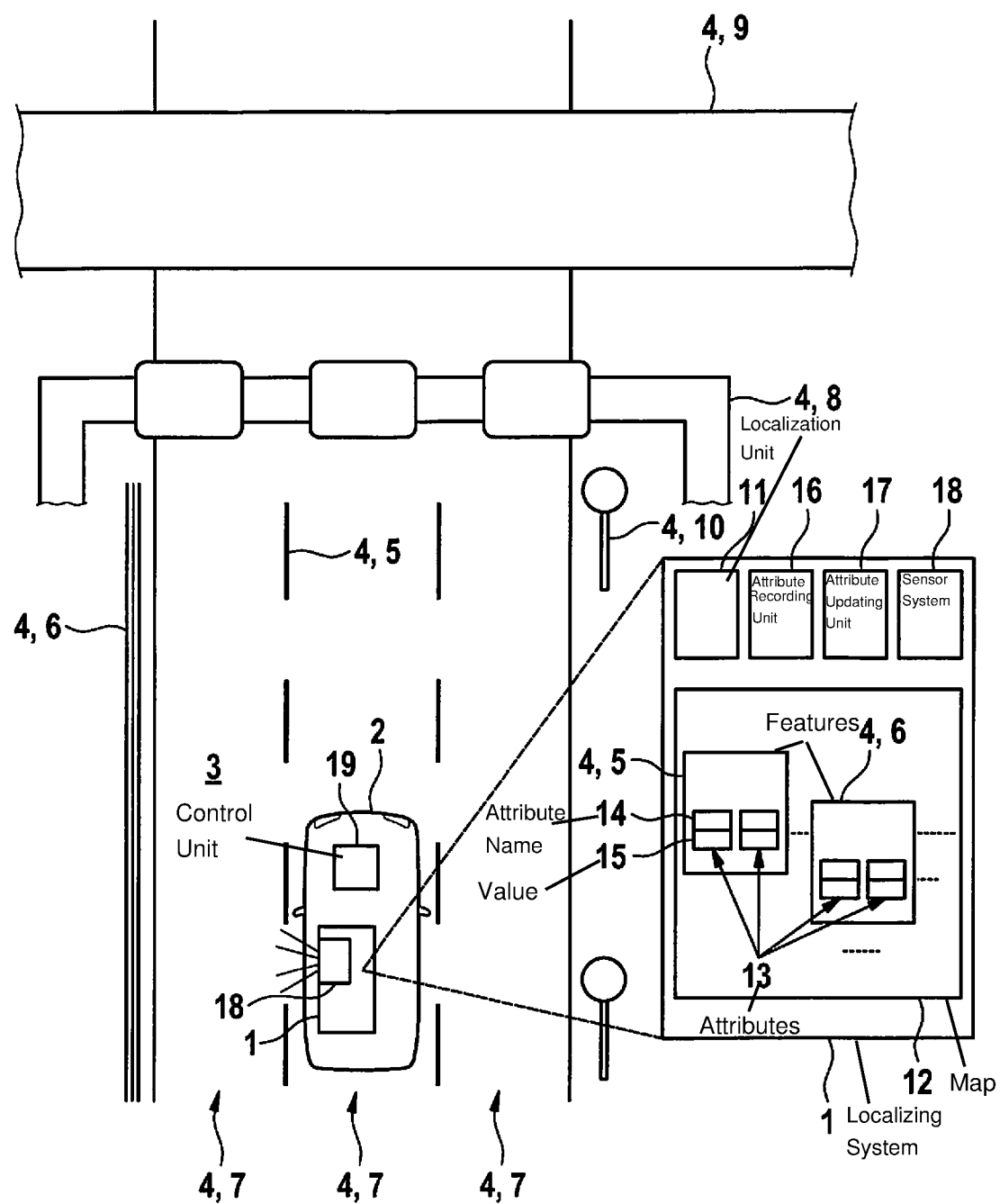
FIG. 1 illustrates a system for localizing a vehicle in an environment in accordance with a specific embodiment of the present invention.

FIG. 1 illustrates a system 1 for localizing a vehicle in accordance with a specific embodiment of the present invention. The system localizes vehicle 2 within environment 3; environment 3 being indicated here in the drawing merely by a reference numeral near vehicle 2. It is a question here of immediate driving environment 3 of the vehicle that may be an intersection or a road or a portion of an expressway, for example. Environment 3 is characterized by the presence of a multitude of features 4 that vehicle 2 is able to orient itself by. Features 4 include, for example, lane markings 5, guardrails 6, lanes 7, sign gantries 8, bridges 9 and road signs 10. Moreover, system 1 has a localization unit 11 for localizing the vehicle using a digital map 12. Digital map 12 includes data for describing features 4. To illustrate this, the drawing also shows features 4, which occur in environment 3, in map 12. In addition, features 4 in map 12 also include attributes 13. Attributes 13 include two aspects and have an attribute name 14, respectively an attribute type, as well as a value 15, of which, for the sake of clarity, only one is provided in each case with a reference numeral in the drawing. Although FIG. 1 illustrates the components of digital map 12 in a block diagram in a highly schematized form, in real examples, digital map 12 may exist in data form.

Attributes 13 are provided for expanding conventional map data and the features thereof, and attributes, by specific attributes 13 which, for that purpose, are assigned by digital map 12 to features 4. New attributes 13 include information for describing possibly occurring changes in stored features 4 in comparison to actual features 4 of environment 3 of vehicle 2. Attributes 13 are thereby configured to enable a particular probability of a change or updatedness of a particular feature, in this case, for example, of feature 5 or of feature 6 to be derived. For example, an attribute type 14 may be an assumed rate of change over time of respective feature 4; and another attribute type 14 may be a point in time of a recent change of respective feature 4 that is known to system 1. An attribute recording unit 16, respectively an attribute acquisition and creation unit 16 of system 1 may be used to create attributes 13. The system preferably also has an attribute updating unit 17, which is adapted for updating the attributes and the values thereof in response to an updating of the customary map data.

System 1, respectively the vehicle also has a driving environment sensor system 18. It is provided for detecting driving environment 3 of the vehicle using sensors, such as radar, lidar sensors, ultrasonic sensors, etc. Vehicle 2 may be precisely localized by comparing features 4 recorded by driving environment sensor system 18 to those in map 12. In particular, it is possible to very accurately determine the position and the orientation relative to the environment. Moreover, system 1 and additional attributes 13 are able to ensure the quality of map 12; i.e., it is possible to prevent the use of outdated or no longer existing map data on features 4. In particular, this is because enhanced digital map 12 makes it possible to reliably determine an assumed updatedness or availability of features 4.

Also shown in FIG. 1 is control unit 19 of vehicle 2. In accordance with this specific embodiment, system 1 is controlled by control unit 19 of vehicle 2.

Using localization system 1, control unit 19 is able to control vehicle 2 in an autonomous driving mode or driver assistance mode. Localization system 1 thereby provides the position and orientation of vehicle 2 in relation to environment 3.

Figure 2:
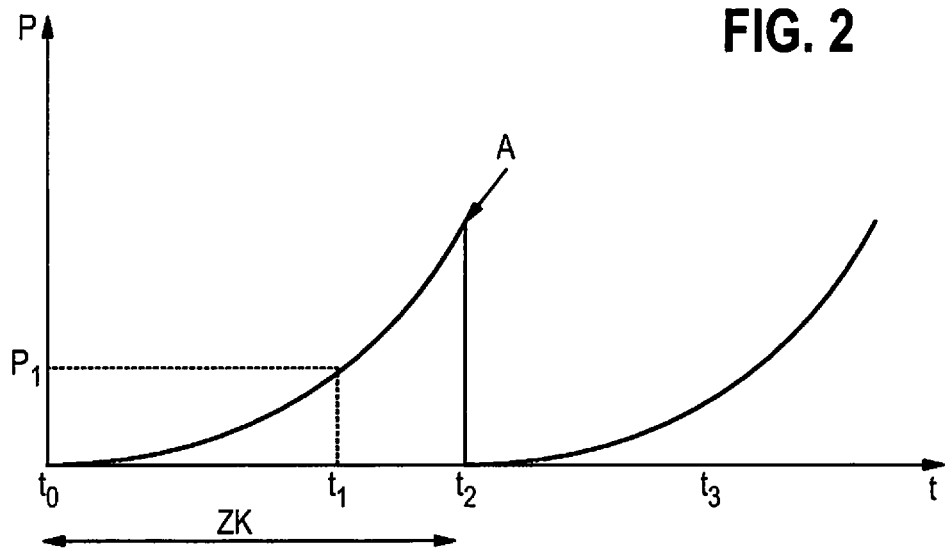
FIG. 2 is a diagram of a typical time characteristic of a probability for a change in the features of a digital map in accordance with a specific embodiment of the present invention.

FIG. 2 shows a diagram of a typical variation with time of a probability P of a change in features 4 of a digital map 12 in accordance with a specific embodiment of the present invention. In FIG. 2, the X-axis shows time t, and Y-axis probability P. As also shown here, the variation with time of probability P for the change is essentially a function of two parameters. Here, they are a cycle time ZK and a point in time of a recent change $t_0$. The cycle time corresponds, for example, to a typical lifetime or a maintenance period, or generally to a length of time, following which a change in the feature typically occurs.

With regard to FIG. 1, the respective quantities, respectively values of $t_0$ and ZK are plotted as values 15 of attributes 13 of particular feature 4 of digital map 12. As may be read off of the illustrated graphs in FIG. 2, a change probability of pi is specified at current point in time $t_1$; a considerable increase in change probability P also being expected in the near future. In addition, at point in time $t_2$, a change A is to be expected in all likelihood since the feature has already reached the typical lifetime thereof. If, however, at point in time $t_3$, for example, it was still not possible to establish any change, it is certainly probable that map 12 is no longer up-to-date. This state may be signaled or be checked by system 1, if possible. If, on the other hand, change A actually took place, and map data, which have been updated accordingly are available, then $t_1$ is the new point in time of the most recent change. If, as is generally the case, the change does not take place at exactly precalculated point in time $t_1$, the model and the attribute data may be adapted accordingly, and a corrected curve function may be used with other parameters.

Although FIG. 2 is merely supposed to indicate a typical change probability curve to be expected, this is utilized, however, by the suitable parameters in the added attributes used for localizing the vehicle.

The cycle duration, respectively rate of change is assigned depending on the feature or type of feature. The following Table 1 shows exemplary, selected types of features and the rates of change assumed in this regard.

TABLE 1

| Type of Feature | Rate of Change |
| --- | --- |
| bridge | low (i.e.. long life cycle) |
| number of traffic lanes | medium |
| sign gantry | medium |
| lane marking | high |
| guardrails | high |
| road signs | very high |

The thereby determined probabilities may be used directly for the vehicle localization, which may be utilized quite advantageously for autonomous vehicles, in particular.

Figure 3:
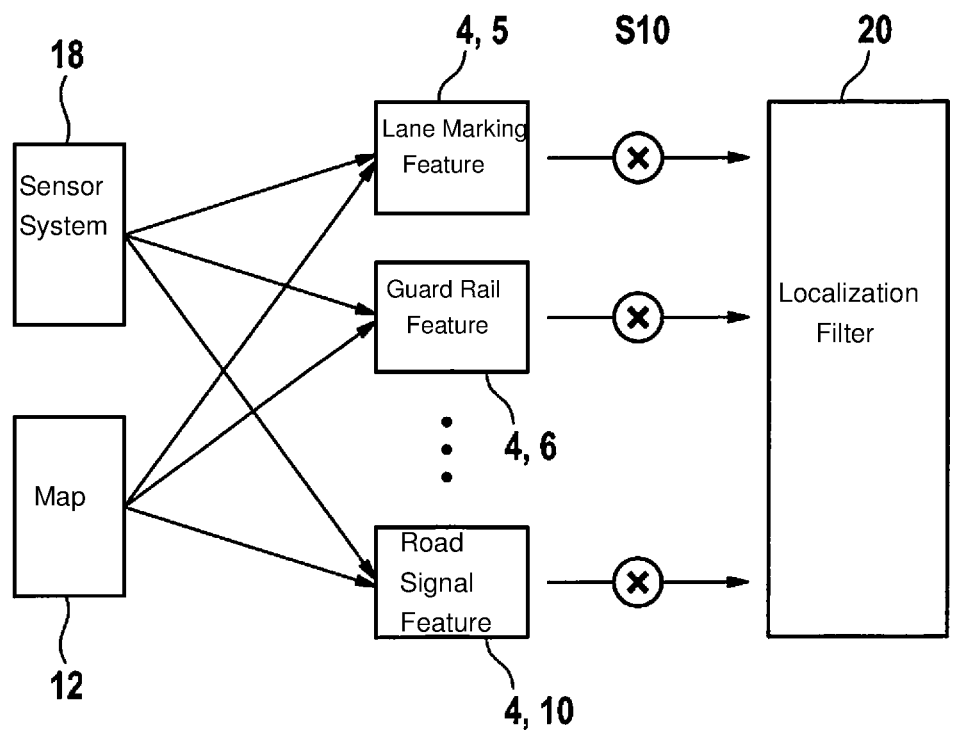
FIG. 3 is a block diagram showing aspects of the system and method according to the present invention for localizing a vehicle in accordance with a specific embodiment of the present invention.

FIG. 3 shows a block diagram illustrating aspects of the system and method according to the present invention for localizing a vehicle, in accordance with a specific embodiment of the present invention. As shown in FIG. 3, both measurements of driving environment sensor system 18, as well as the data of digital map 12 are included in a determination of a feature 4. A network of feature positions, which are processed by localization filter 20, may be created in this manner. In comparison to conventional systems, where the filter fuses merely the positions of the various features, and where merely a general approach for the position and orientation of the vehicle may be output, a weighting and prioritization S10 are undertaken here. The weighting and prioritization S10 take effect when uncertainties result in the case of a comparison of the sensor measurement data to the map data.

In descriptive terms, when system 1 recognizes, for example, that considering a feature 4 in the map yields a different ascertained position and/or location of vehicle 2 than when this feature 4 is not considered, then this feature 4 may be considered to a corresponding lesser extent or not considered for the localization when it is determined that, in all likelihood, feature 4 is already changed or is no longer up-to-date. Furthermore, in descriptive terms, a ranking or sequence of the consideration of the features may be generated.

Thus, for example, when it is known that a feature was changed only recently, it may be assumed that probability P for a further change A is relatively low and that, for this reason, a high weight, respectively a high priority is allowed. Or, in the case of ambiguities, it may be assumed, for example, that a shifted traffic sign is more likely than a shifted sign gantry, which is taken into consideration in the digital map by relevant attribute values.

What is claimed is:

1. A method for localizing a vehicle using a digital map that describes one or more features, the method comprising:
   for a respective one of the one or more features, causing the digital map to assign at least one predetermined attribute to the respective feature, wherein the at least one predetermined attribute characterizes an actual change made to the digital map regarding the respective feature;
   determining a corresponding probability for a further change based on the assigned at least one predetermined attribute; and
   localizing the vehicle in consideration of the determined probability.

2. The method as recited in claim 1, wherein the respective feature is of an environment of a vehicle.

3. The method as recited in claim 1, wherein the at least one predetermined attribute includes a value that is specified in accordance with a particular type of the respective feature.

4. The method as recited in claim 1, wherein the at least one predetermined attribute includes information about one of a cycle time and a change rate, and includes information about a point in time of a most recent change of the respective feature.

5. The method as recited in claim 1, wherein the one or more features include a plurality of features, and wherein the at least one predetermined attribute includes a plurality of attributes, the method further comprising:
   recording a version of the respective feature in a driving environment of the vehicle using a driving environment sensor system;
   comparing the recorded version of the respective feature to a version of the feature in the digital map; and
   when the comparing yields an ambivalence, at least one of prioritizing and weighting the respective feature based on a respective probable availability or updatedness determined from the attributes.

6. The method as recited in claim 5, wherein, responsive to an updating of the digital map, the attributes assigned to the respective feature are adapted accordingly.

7. The method as recited in claim 1, wherein the at least one predetermined attribute identifies when the actual change was made.

8. The method as recited in claim 1, wherein the at least one predetermined attribute indicates an expected time the further change is expected to occur.

9. The method as recited in claim 1, wherein the at least one predetermined attribute identified when the actual change was made and an expected period of time from when the actual change was made to when the further change is expected to occur.

10. A method for localizing a vehicle using a digital map that describes a feature, the method comprising:
    causing the digital map to assign at least one predetermined attribute to the feature, wherein the at least one predetermined attribute characterizes the feature changing relative to the digital map;
    determining, based on the at least one predetermined attribute, a model for a progression over time of a probability of the changing of the feature; and
    localizing the vehicle based on the probability.

11. The method as recited in claim 10, wherein the model is formed as at least one of a periodic superlinearity curve and a piecewise superlinearly rising sawtooth-like curve.

12. A system of a vehicle for localizing the vehicle using a digital map that describes one or more features to a respective one of which is assigned at least one predetermined attribute that characterizes an actual change made to the digital map regarding the respective feature, the system comprising:
    a localization unit, wherein the localization unit is configured to:
       determine a probability for a further change based on the assigned at least one predetermined attribute; and
       localize the vehicle based on the determined probability.

13. The system as recited in claim 12, wherein the respective feature is of an environment of the vehicle.

14. The system as recited in claim 12, wherein the localization unit is further configured to:
    read and record the at least one predetermined attribute, the localization unit being connected to a memory for the digital map; and
    update the at least one predetermined attribute in response to an updating of map data.

15. The system as recited in claim 12, wherein the one or more features include features created or influenced by people, including lane markings, bridges, buildings, a number of lanes or sign gantries, and/or road signs.

16. A vehicle, comprising:
    a control unit, wherein the control unit is configured to perform a method that uses a digital map that describes one or more features to a respective one of which is assigned at least one predetermined attribute that characterizes an actual change made to the digital map regarding the respective feature, the method comprising determining a probability for a further change based on the assigned at least one predetermined attribute; and localizing the vehicle based on the determined probability.

17. The vehicle as recited in claim 16, wherein the vehicle is an autonomously driving vehicle.

18. A non-transitory computer-readable medium on which are stored instructions that are executable by a processor of a vehicle and that, when executed by the processor, causes the processor to perform a method for localizing the vehicle using a digital map that describes one or more features, the method comprising:

for a respective one of the one or more features, causing the digital map to assign at least one predetermined attribute to the respective feature, wherein the at least one predetermined attribute characterizes an actual change made to the digital map regarding the respective feature;

determining a corresponding probability for a further change based on the assigned at least one predetermined attribute; and localizing the vehicle in consideration of the determined probability.

* * * * *